US011765642B2

(12) United States Patent
Fletcher et al.

(10) Patent No.: US 11,765,642 B2
(45) Date of Patent: Sep. 19, 2023

(54) MANET NETWORK MANAGEMENT

(71) Applicant: Harris Global Communications, Inc., Rochester, NY (US)

(72) Inventors: Harold W. D. Fletcher, Rochester, NY (US); Terence W. O'Brien, Webster, NY (US); Jason Stanislawski, Rochester, NY (US); Alex Peach, Rochester, NY (US); Michael Woodruff, Rochester, NY (US); Aaron Dobson, Rochester, NY (US); Mark T. Holcomb, Brockport, NY (US); Ted Tomporowski, Macedon, NY (US); Nick Van Stralen, Bloomfield, NY (US)

(73) Assignee: HARRIS GLOBAL COMMUNICATIONS, INC., Rochester, NY (US)

( * ) Notice: Subject to any disclaimer, the term of this patent is extended or adjusted under 35 U.S.C. 154(b) by 0 days.

(21) Appl. No.: 17/665,178

(22) Filed: Feb. 4, 2022

(65) Prior Publication Data
US 2023/0254754 A1 Aug. 10, 2023

(51) Int. Cl.
*H04W 40/24* (2009.01)
*H04W 84/18* (2009.01)
*H04W 88/14* (2009.01)

(52) U.S. Cl.
CPC ....... *H04W 40/244* (2013.01); *H04W 40/248* (2013.01); *H04W 84/18* (2013.01); *H04W 88/14* (2013.01)

(58) Field of Classification Search
None
See application file for complete search history.

(56) References Cited

U.S. PATENT DOCUMENTS

| 7,184,421 | B1 | 2/2007 | Liu et al. |
| 7,522,731 | B2 | 4/2009 | Klemba et al. |
| 8,917,671 | B2 | 12/2014 | Jing et al. |
| 8,942,197 | B2 | 1/2015 | Rudnick et al. |
| 9,041,349 | B2 | 5/2015 | Bemmel et al. |
| 9,967,331 | B1 | 5/2018 | Hasson et al. |
| 10,285,208 | B2 | 5/2019 | Schwartz et al. |

(Continued)

FOREIGN PATENT DOCUMENTS

WO 2008005994 1/2008
WO 2015171759 A1 11/2015

*Primary Examiner* — Kenny S Lin
(74) *Attorney, Agent, or Firm* — Fox Rothschild LLP; Carol Thorstad-Forsyth

(57) ABSTRACT

Mobile ad hoc Network (MANET) includes a first node of a plurality of nodes which self-assigns a role as a part of a network-spanning backbone upon a determination by the first node that one or more criteria have been satisfied. The first node uses the network-spanning backbone to facilitate a first-tier control plane communication service within the MANET. The first node also communicates within the MANET using a second-tier control plane communication service separate from the first-tier control plane communication service. The second-tier control plane communication service is used by the first node when communicating exclusively with neighbor nodes that are a 1-hop distance from the first node.

24 Claims, 10 Drawing Sheets

(56) References Cited

U.S. PATENT DOCUMENTS

| | | | |
|---|---|---|---|
| 11,627,516 B2* | 4/2023 | Zhu | H04L 5/0012 |
| | | | 370/252 |
| 2006/0133394 A1 | 6/2006 | Ware et al. | |
| 2006/0198324 A1 | 9/2006 | Nerses et al. | |
| 2013/0100942 A1 | 4/2013 | Rudnick et al. | |
| 2013/0250811 A1* | 9/2013 | Vasseur | H04W 40/023 |
| | | | 370/254 |
| 2015/0208318 A1* | 7/2015 | Mosko | H04L 41/40 |
| | | | 370/310 |
| 2015/0254439 A1* | 9/2015 | Ao | G06Q 50/184 |
| | | | 726/26 |
| 2016/0323240 A1* | 11/2016 | Murray | H04L 61/45 |
| 2020/0236607 A1* | 7/2020 | Zhu | H04W 40/26 |
| 2021/0306861 A1* | 9/2021 | Elmasry | H04W 88/16 |
| 2022/0399948 A1* | 12/2022 | Dunn | H04L 12/189 |

* cited by examiner

| Epoch | Mux | CID1 | CID2 | CID3 | CID4 |
|---|---|---|---|---|---|
| 1 | 0 | TX | | | |
| 2 | 1 | Relay 1 | | | |
| 3 | 2 | Relay 2 | | | |
| 4 | 3 | | TX | | |
| 5 | 4 | | Relay 1 | | |
| 6 | 5 | | Relay 2 | | |
| 7 | 6 | | | TX | |
| 8 | 7 | | | Relay 1 | |
| 9 | 8 | | | Relay 2 | |
| 10 | 9 | | | | TX |
| 11 | 10 | | | | Relay 1 |
| 12 | 11 | | | | Relay 2 |
| 13 | 0 | Relay 3 | | | |
| 14 | 1 | Relay 4 | | | |
| 15 | 2 | Relay 5 | | | |
| 16 | 3 | | Relay 3 | | |
| 17 | 4 | | Relay 4 | | |
| 18 | 5 | | Relay 5 | | |
| 19 | 6 | | | Relay 3 | |
| 20 | 7 | | | Relay 4 | |
| 21 | 8 | | | Relay 5 | |
| 22 | 9 | | | | Relay 3 |
| 23 | 10 | | | | Relay 4 |
| 24 | 11 | | | | Relay 5 |

FIG. 7 ered to choose, as the self-assigned role, a role as a cluster-head in the first-tier control plane communication service.

MANET NETWORK MANAGEMENT

BACKGROUND

Statement of the Technical Field

The inventive arrangements relate to communication networks, and more particularly to methods and systems for managing mobile ad-hoc networks.

DESCRIPTION OF THE RELATED ART

A mobile ad-hoc network (MANET) is a wireless self-configuring network in which data is communicated from one or more source nodes to at least one destination node in a series of wireless hops which can traverse one or more nodes. New nodes can be configured to automatically join with an existing network when in wireless range of the one or more nodes that form the MANET. The nodes forming a MANET can be stationary or mobile. Further, each node in the network is commonly configured so that it can function in the role of a terminal node and/or a router for other nodes in the network. An important aspect of a MANET is that the nodes are self-organized and without a fixed topology. As a result of the foregoing, the topology of a MANET is often highly variable and can change in ways that are difficult to predict.

All MANETs are resource constrained, with only so many over the air (OTA) resources available. This results in certain constraints being placed upon the control and operation of such networks. In some scenarios, it is desirable for a MANET to have a low probability of detection (LPD). This goal can add further constraints to the way in which the network is implemented. For example, one way in which a MANET can reduce the probability of detection is by reducing over the air (OTA) traffic as much as possible. Still, there are certain aspects of a MANET that require OTA traffic. For example, in order to forward traffic efficiently to network destinations, nodes must learn about the network around them, in a process known as Network Discovery. Such information can involve the total number of nodes comprising the network, the identity of those nodes, available routes to those nodes, and distance to the nodes. As the number of nodes in a MANET increases, there is a tendency for OTA traffic to also increase.

SUMMARY

Embodiments concern a Mobile ad hoc Network (MANET) and methods for managing same. The method can involve self-assigning by a first node of a plurality of nodes comprising the MANET a role as a part of a network-spanning backbone upon a determination by the first node that one or more criteria have been satisfied. In so doing, the first node can assume the role of a cluster-head node which comprises a part of a first-tier control plane communication service. Thereafter, the first node uses the network-spanning backbone to help facilitate the first-tier control plane communication service within the MANET. The method further involves communicating by the first node within the MANET using a second-tier control plane communication service separate from the first-tier control plane communication service when communicating exclusively with neighbor nodes that are a 1-hop distance from the first node.

According to one aspect, the method can further involve choosing by the first node one or more bridge nodes of said first tier control plane communication service which facilitate communication by the first-node with neighbor nodes that are a 2-hop distance from the first node. Thereafter, the first node uses the network-spanning backbone to facilitate communication with all nodes of the network. The method can further involve choosing by the first node a cluster ID corresponding to a set of time slots in a Time Division Multiple Access (TDMA) waveform.

The first node uses the network-spanning backbone to facilitate de-confliction of the cluster ID. The first node can also use the network-spanning backbone to communicate information concerning all of its 1-hop neighbors to the plurality of nodes comprising the MANET. The above-described process involving the first node can similarly occur concurrently in different places in the network. Accordingly, other nodes can also become cluster-head nodes. Together all of these self-assigned cluster-head nodes form a part of the network-spanning backbone to facilitate the various communication services.

Embodiments also include a communication node for carrying out the methods described herein for communicating in a Mobile ad hoc Network (MANET). The communication node includes a communication transceiver configured to facilitate wireless communications between the communication node and other nodes of the MANET. The communication node also includes a computer processor device. The computer processor device is configured to self-assign to the communication node a role as a part of a network-spanning backbone of the MANET upon a determination by the communication node that one or more criteria have been satisfied. The network spanning backbone is comprised of a plurality of nodes of the MANET. According to a further aspect, the computer processor device is configured to cause the communication node to use the network-spanning backbone to facilitate communication with all nodes of the network.

The computer processor device is also configured to cause the communication node to use the network-spanning backbone to facilitate a first-tier control plane communication service within the MANET and to communicate within the MANET using a second-tier control plane communication service. The second-tier control plane communication service is separate from the first-tier control plane communication service and is used by the communication node for communicating exclusively with neighbor nodes that are a 1-hop distance from the communication node.

Upon assuming a role for the communication node as part of the network-spanning backbone, the computer processor device can choose one or more bridge nodes of the first-tier control plane communication service. The one or more bridge nodes can be used to facilitate communication by the communication node with one or more neighbor nodes that are a 2-hop distance from the communication node.

The self-assigned role chosen by the communication node can be as a cluster-head in the first-tier control plane communication service. In such a scenario, the computer processor device can be further configured to choose a cluster ID corresponding to a set of time slots in a Time Division Multiple Access (TDMA) waveform. In this regard, the computer processor device can be further configured to cause the communication node to use the network-spanning backbone to facilitate de-confliction of the cluster ID.

The computer processor device can cause the communication node to use the network-spanning backbone to communicate information concerning all of its 1-hop neighbors to the plurality of nodes comprising the MANET. According to a further aspect, the communication node can be configured use an avalanche communication method to facilitate the first tier control plane communication service in which identification the communication node as the source of transmitted messages is implied based on the time slot in which the message is communicated.

The computer processor device is configured to claim for the communication node a tier 2 beacon time slot of the TDMA waveform. The computer processor device can also be configured to use the tier 2 beacon time slot to confirm that the tier 2 beacon time slot is conflict free within a 2-hop distance of the communication node. Thereafter, the computer processor device can cause the communication node to use the tier 2 beacon time slot to discover its neighbor nodes which are within a 2-hop distance of the communication node. The computer processor device can be further configured to use the tier 2 beacon time slot to determine a network role of each of the neighbor nodes within a 2-hop distance of the communication node. The computer processor device can then use information it has determined concerning the network role of each of the neighbor nodes within the 2-hop distance as a basis for determining whether the one or more criteria have been satisfied.

BRIEF DESCRIPTION OF THE DRAWINGS

Embodiments will be described with reference to the following drawing figures, in which like numerals represent like items throughout the figures, and in which:

FIG. 7 is a drawing that is useful for understanding how data is relayed in a MANET given the TDMA nature of the underlying channel.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

Embodiments disclosed herein may provide certain advantages in a MANET communication network. In particular, certain embodiments can improve performance of such networks by utilizing a two-tiered mechanism for network discovery and control plane communication. These two control planes, which are referred to herein as Tier 1 and Tier 2 communications, facilitate and support the regular communication of routine voice and data traffic among the nodes of the network.

According to one aspect, all nodes in the network can hear transmissions on a Tier 1 communication backbone of the network. The Tier 1 communication backbone applies certain clustering rules and utilizes avalanche communication methods. These techniques are described below in further detail. However, it should be understood that an advantage of the Tier 1 communication backbone is that it provides a way to allow all nodes in the network efficiently discover the existence, and route-ability of all other nodes, while maintaining a low probability of detection. The Tier 2 communication service is a 1-hop local beacon service that includes all nodes comprising the network. The Tier 1 and Tier 2 control planes in combination facilitate a low overhead routing solution that significantly reduces over-the-air traffic.

Figure 1:
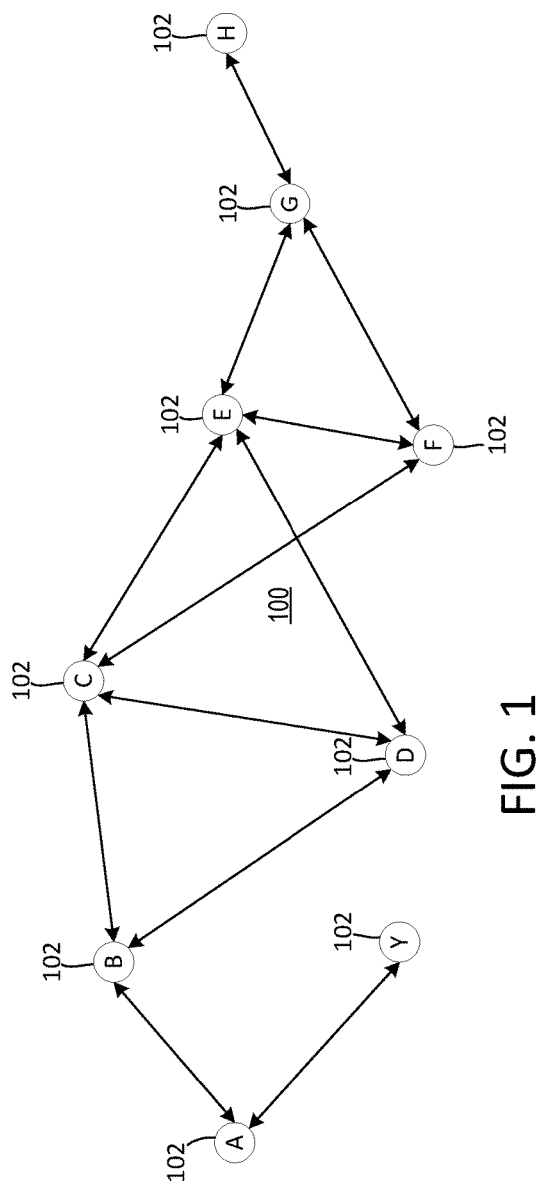
FIG. 1 is a drawing that is useful for understanding a multi-hop MANET comprising a plurality of nodes.

An example of a mobile ad-hoc network (MANET) 100 is shown in FIG. 1. The MANET is a wireless self-organizing network in which data is communicated between a plurality of nodes 102 in a series of one or more wireless hops from a particular node 102 that is the source of a communication to a different node 102 that is an intended recipient of a particular communication. The nodes 102 which comprise the network 100 can be stationary or mobile and it is understood that new nodes 102 can join the network automatically when in wireless range of any of the existing nodes comprising the network. In a network access system described herein, each node 102 comprising the network 100 can function in the role of a terminal node and/or a router for other nodes in the network. Further, each node may be assigned certain identifying information. For example, such identifying information can be a multi-bit digital identification value. This value is hereinafter sometimes referred herein as a node ID. As explained herein in further detail, there is no single node that controls the network operation or prioritization of resources. Further, although a particular example of a network topology is shown in FIG. 1, it should be understood that a MANET 100 as described herein is self-organized and therefore can have any topology.

Figure 2:
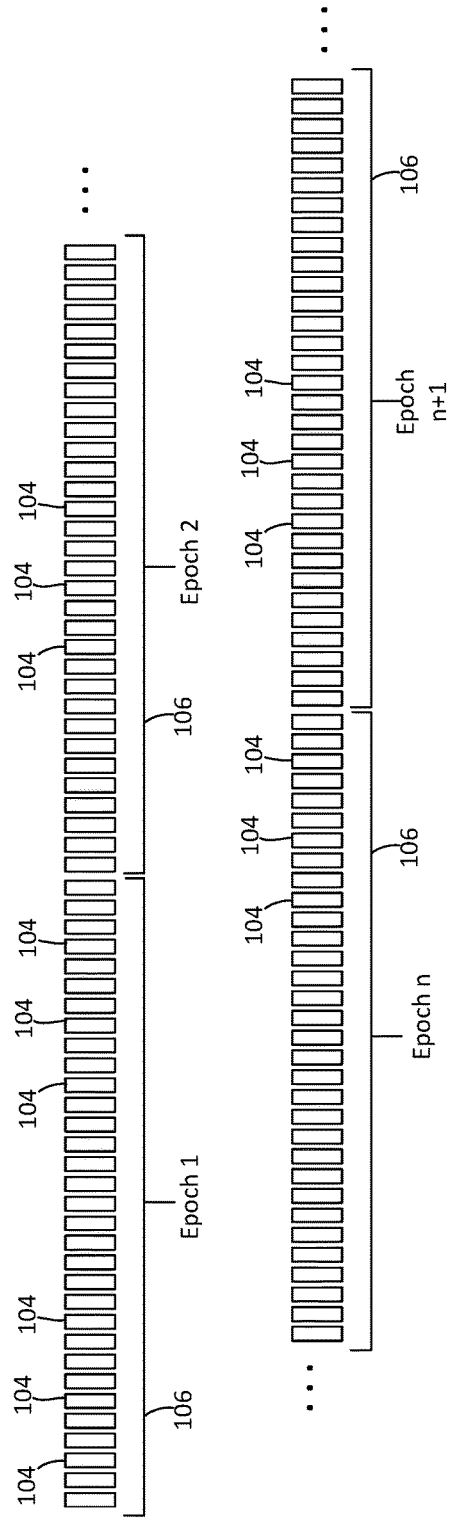
FIG. 2 is a drawing that is useful for understanding certain concepts of a time division multiple access channel sharing arrangement.

According to one aspect, a MANET described herein can operate in accordance with a time division multiple access (TDMA) arrangement. With reference to FIG. 2, it will be understood that a particular RF channel in a TDMA based system can be divided into a plurality of time slots 104 which are organized within a series of successive epochs 106. Each epoch associated with the TDMA waveform is comprised of a predefined number of time slots 104. The epochs 106 can in some scenarios be numbered so that different epochs can be individually identified (e.g., epoch 1, epoch 2, . . . epoch n, epoch n+1 . . . ). In a TDMA based system the plurality of nodes 102 can share and use the same RF channel. This is accomplished by assigning nodes 102 permission to use various different time slots of an RF channel for certain specified purposes.

Avalanche communications as that term is used herein involves a data relay process in a MANET network in which two or more nodes transmit the same data concurrently during the same time slot. This concept may be understood with reference to FIG. 1. For example, assume that node A seeks to communicate a message P to node E. During a first epoch T1, node A can transmit message P to nodes B and Y. During a second epoch T2, the message P will be retransmitted concurrently during the same time slot by nodes B and Y in a first relay operation. Assume that for some reason, the relay transmission from node Y is not received by any other node, but the relay transmission from node B is received by nodes C and D. Thereafter, in a third epoch T3, nodes C and D will concurrently transmit during the same time slot to relay message P to the nodes E and F. At the receiving end of such relay communication, nodes E and F will each treat the two nearly simultaneous messages transmitted by C and D as multipath communication of the same message. This improves the chances of reception by nodes E and F, but also has the beneficial effect of improving bandwidth utilization since both messages are broadcast at the same time. This technique of concurrent transmission of the same data by different nodes is referred to as an avalanche transmission method.

Figure 3:
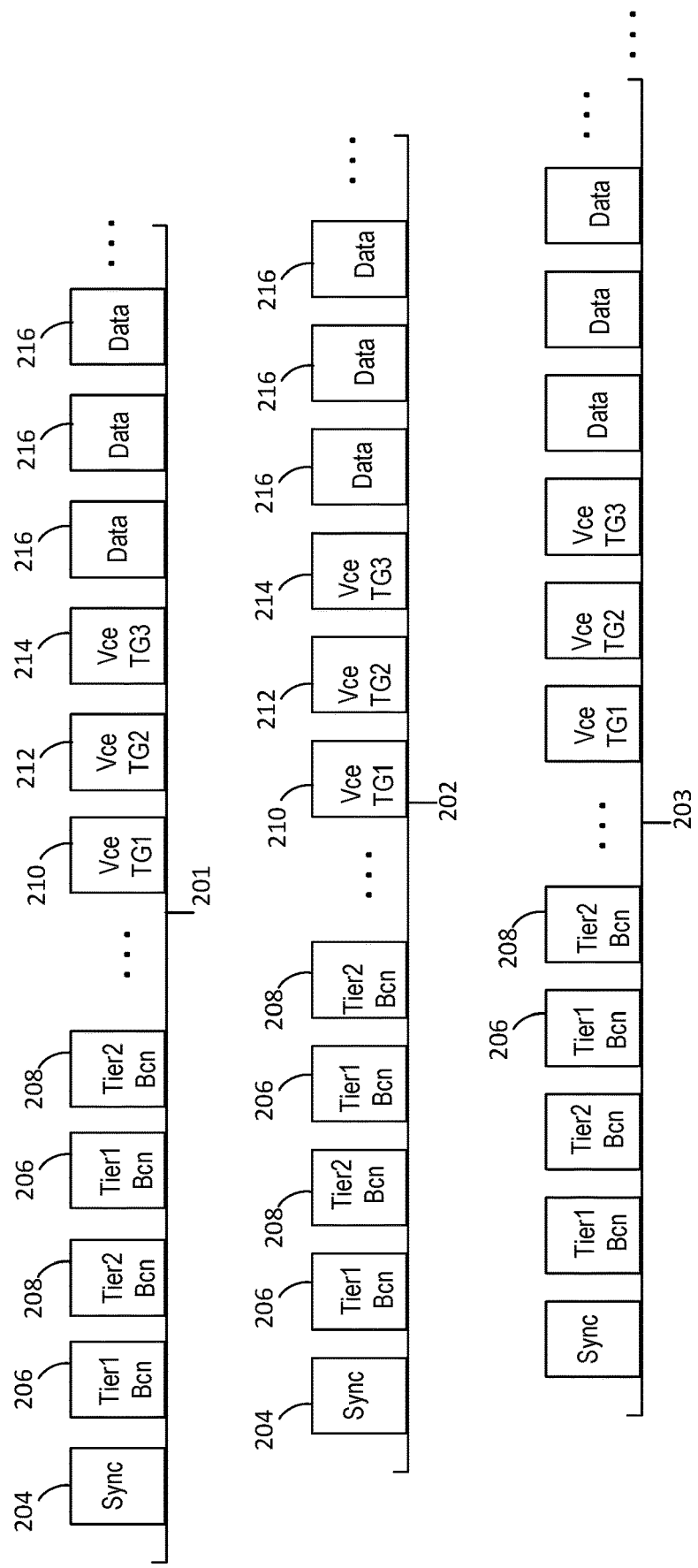
FIG. 3 is a drawing that is useful for understanding a time-expanded view of a time division multiple access channel sharing arrangement.

FIG. 3 shows a time-expanded view of a succession or series of three epochs 201, 202, 203 comprising an example of a TDMA waveform which is useful for understanding certain aspects of a solution presented herein. Within each epoch, certain time slots can be designated for certain predetermined purposes. For example, in some scenarios a Sync time slot 204 can contain time synchronization data to facilitate timing alignment of the various nodes 102 comprising the network. Similarly, each epoch can contain a plurality of Tier 1 and Tier 2 beacon time slots. These slots are shown in FIG. 3 as Tier1 Bcn time slots 206 and Tier2 Bcn time slots 208. These Tier 1 and Tier 2 beacon slots are used to facilitate certain control plane communications which are discussed below in further detail.

Certain time slots can also be reserved for data traffic communicated among the various nodes. For example, in FIG. 3, each epoch includes time slots 210, 212, 214 which in this example are reserved for digital voice communications among certain talk groups (e.g., TG1, TG2 and TG3). In the scenario shown, these time slots 210, 212, 214 are respectively labeled Vce TG1, Vce TG2, and Vce TG3. Other time slots 216 can be used for communicating other types of routine data traffic among the nodes comprising network. Time slots used for data traffic can be advantageously assigned dynamically to various nodes on an as-needed basis. It should be understood that the specific arrangement of time slots is not critical and alternative time slot assignments are possible to facilitate various network control operations.

Further, it should be understood that in some scenarios time slot usage can be multiplexed. Accordingly, there are some scenarios in which control plane and traffic communications can be allocated to data slots which may or may not map to a single specific TDMA time slot and may or may not appear in every epoch. In this regard, FIG. 3 should be understood to merely represent one possible example of a TDMA waveform slot assignment and is not intended to be limiting. Likewise, it should be understood that not all networks incorporating the solution disclosed herein will necessarily include the same number or position of slot assignments for control and data transmission.

Figure 4:
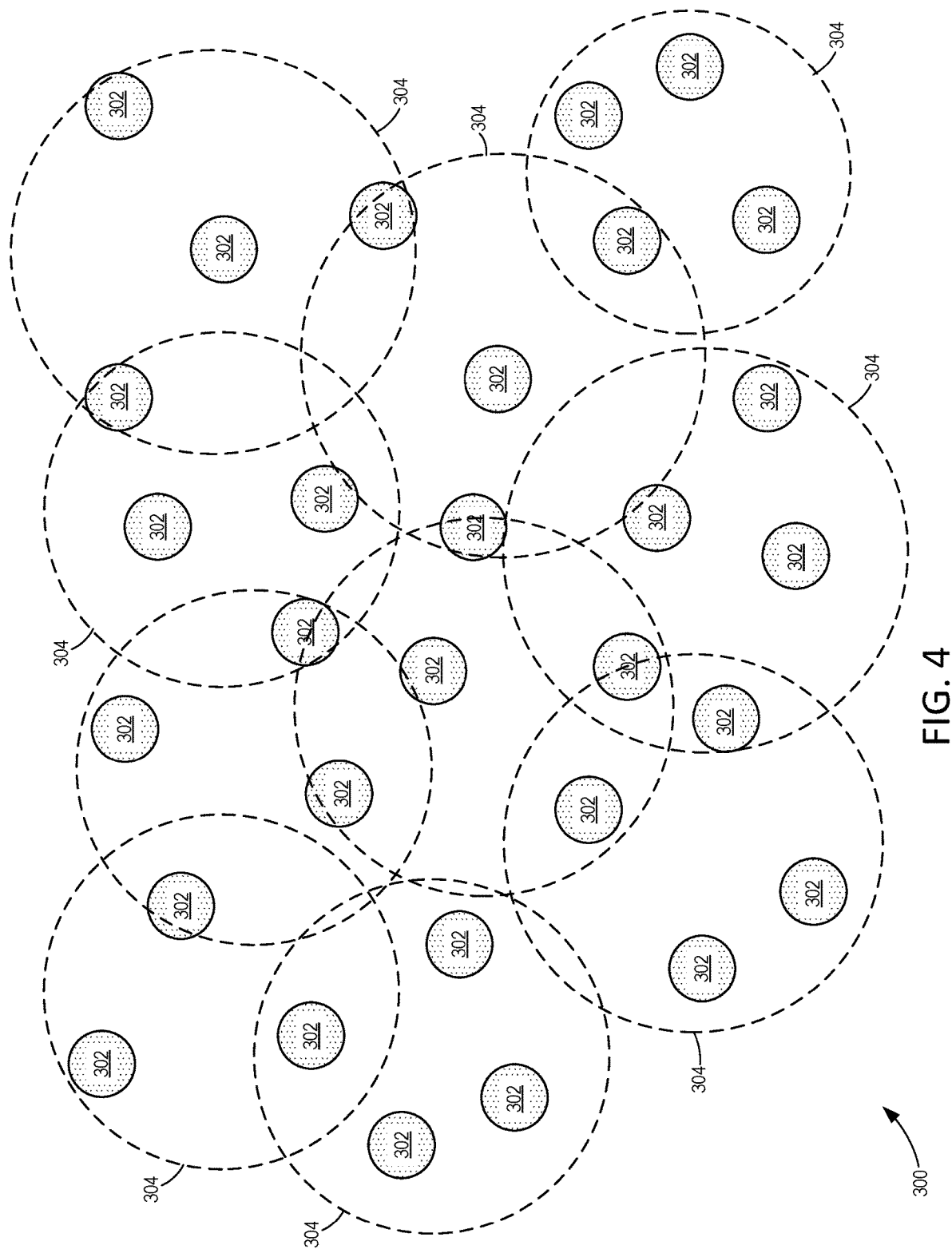
FIG. 4 is a drawing that is useful for understanding a Tier 2 control plane communication service in a MANET.
Figure 5:
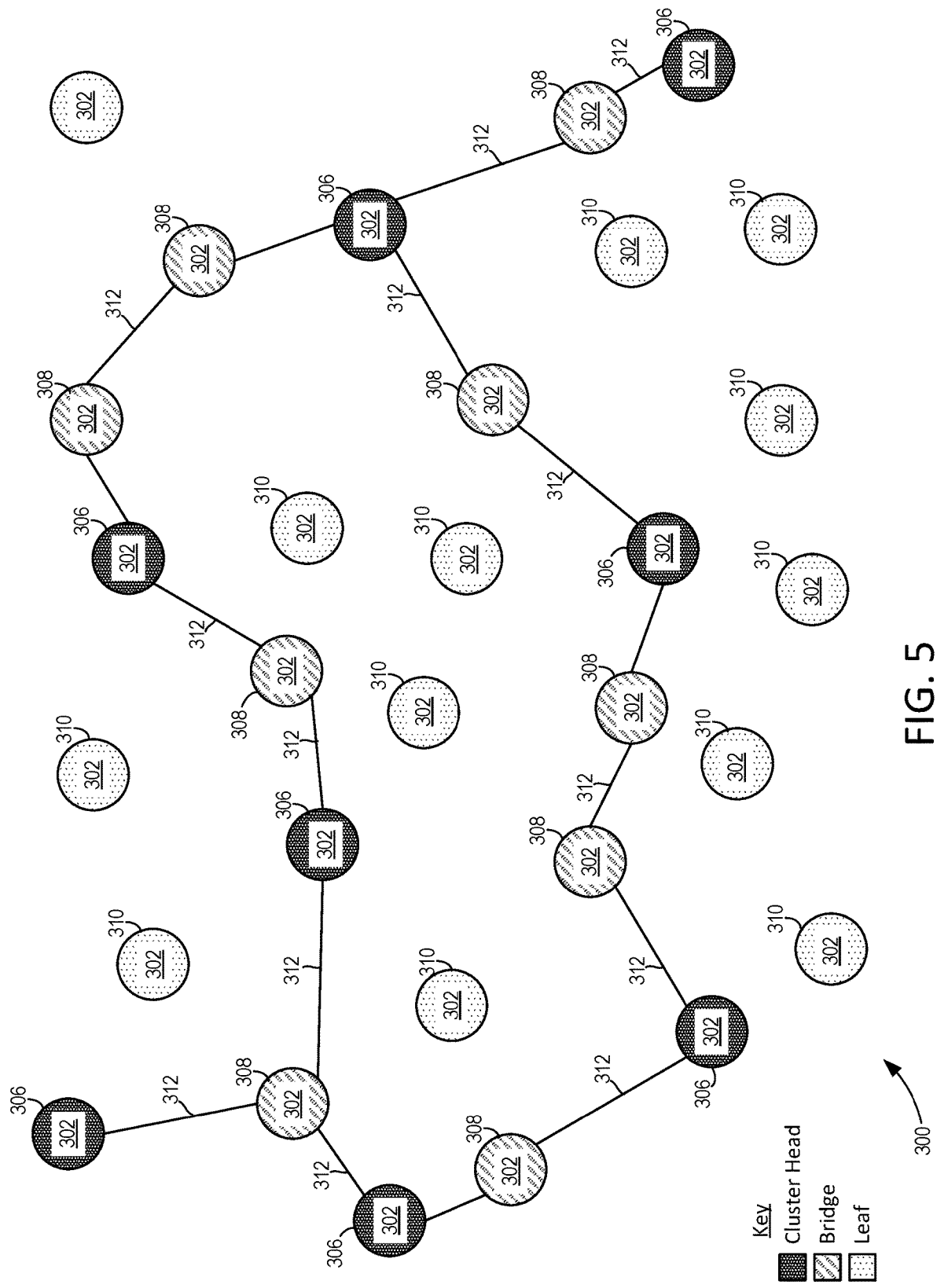
FIG. 5 is a drawing that is useful for understanding a Tier 1 control plane communication service and network backbone provided in the MANET of FIG. 4.

In a network solution disclosed herein, two control plane communication services are facilitated. A first communication service is referred to as a Tier 1 service, and a second communication service is referred to as a Tier 2 service. The diagram shown in FIG. 4 is useful for understanding a Tier 2 communication service and the diagram shown in FIG. 5 is useful for understanding a Tier 1 communication service.

According to one aspect, a Tier 2 communication service becomes available first within a network and comprises all nodes in the network. To facilitate the Tier 2 communication service, each node 302 claims for itself a TDMA Tier 2 beacon slot and ensures that such slot is conflict-free within its 2-hop neighborhood. For purposes of this disclosure, the phrase "2-hop neighborhood" may be understood to include all nearby nodes which are within a maximum of two network hops from a particular node.

The precise method by which a Tier 2 beacon slot is selected and then claimed by a particular node is not critical and various mechanisms are possible. However, in a network solution disclosed herein, this process of claiming a Tier 2 beacon slot will advantageously occur without the need for centralized control and/or communication with a singular node having overall network control responsibility. For example, in one scenario each node seeking to join a network can monitor network communications to identify certain TDMA tier 2 beacon slots that are or are not in use. Alternatively, or in addition thereto, such monitoring can involve certain control plane time slots associated with the TDMA waveform that contain information relating to known Tier 2 beacon channel usage. In other scenarios, various alternative types of out-of-band signaling such as special dedicated RF control channels can also be monitored for this purpose. Combinations of these various methodologies are also possible. In all such implementations, the goal will be to allow joining nodes to gain access quickly and efficiently to a specific TDMA Tier 2 beacon slot that is conflict-free within its 2-hop neighborhood.

Once a joining node has claimed a particular Tier 2 beacon time slot, it can begin communicating with its 1-hop neighbor nodes in accordance with the network Tier 2 communication service. In some scenarios, such communications can initially involve receiving data transmitted from nearby nodes. For example, all nodes will regularly publish data revealing their knowledge of the 1-hop network environment within the Tier 2 communication service. As such, the joining node will discover particular Tier 2 beacon time slots which are available for use. The joining node can also obtain from its 1-hop neighbors certain information about neighbor nodes within its 2-hop neighborhood. In particular, the joining node can receive from its 1-hop neighbor nodes information concerning their identity (node ID) and any network role status that they may have acquired. Finally, the joining node will also receive from 1-hop neighbor nodes information concerning the identity (node ID) and network role status that has been acquired by any 2-hop neighbor nodes.

As will be understood from FIG. 4, a MANET 300 comprised of nodes 302 can include a Tier 2, 1-hop, local beacon service. The Tier 2 beacon service includes all nodes 302 which are part of the network. To help illustrate this concept, the nodes 302 are shown in circles 304. The nodes within each circle can be thought of as logical groupings of nodes that can all communicate with each other within one network hop, using the Tier 2 beacon service.

The same network 300 that is shown in FIG. 4 is also shown in FIG. 5. It can be observed in FIG. 5 that some of the network nodes 302 which participate in the Tier 2 communication service will also participate in a Tier 1 communication service. In particular, once a node has acquired information concerning the identity and the network role of nodes within its 2-hop neighborhood, it will determine whether to assign itself a particular network role as part of the Tier 1 communication service. For example, such a node may determine whether to assign itself a network role as a cluster head node 306. This determination can be based on the application of a set of predetermined rules which are known to each node. If the rules, and/or the conditions set by the rules are satisfied, then the node will determine that it is a cluster head 306. As used herein, cluster head nodes are those nodes which are permitted to originate data transmissions on the Tier 1 communication service.

The rules set applied by the network nodes can be summarized as follows:

Rule 1A: If a node does not hear a cluster head in its 1-hop-neighborhood, it will declare itself a cluster head after a timeout period. In some scenarios, this timeout period can have a duration which is randomized (e.g., one beacon cycle plus some random number of elapsed epochs between zero and a second beacon cycle).

Rule 1B: If a node hears a cluster head in its 1-hop neighborhood, it will declare itself a leaf node and will only promote itself to cluster head if it is unable to verify a symmetric link to the heard cluster head after a timeout period (Rule 1A). This timeout period can also have a duration which is randomized. For example, the duration can include 3 beacon cycles plus some random number of epochs from zero to beacon cycle. This timeout period allows the cluster head node three opportunities to hear the potential leaf node.

Rule 2: If a cluster head hears another cluster head and the link is symmetric, it will step down to a leaf node.

Rule 3: All nodes need (at least) one 2-hop-neighborhood-unique TDMA Tier 2 routine beacon slot/mux.

Rule 4: A cluster head will select bridge nodes from the set of nodes in its symmetric 1-hop neighborhood that in turn have symmetric links to at least one additional node in the 2-hop neighborhood of the cluster head.

Rule 5: bridge nodes will step down to a leaf node if all cluster heads that previously selected it are no longer selecting it.

Rule 6: A cluster head node will select bridge nodes using a first-discovered path selection algorithm.

Figure 6A:
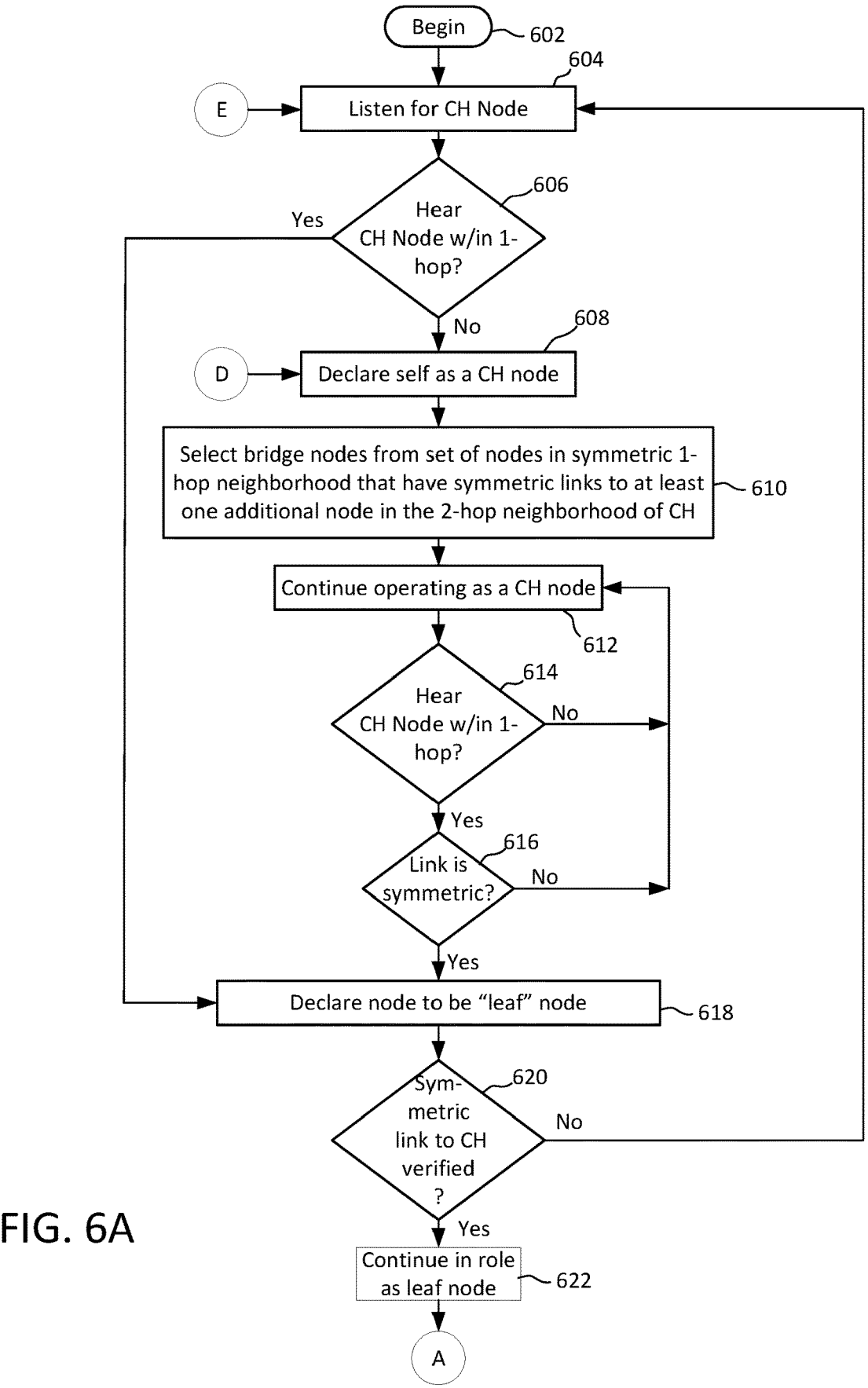
FIGS. 6A-6C are a set of drawings comprising a flowchart that is useful for understanding a rule set under which nodes in a MANET may adapt their operation based on their discovered neighbors.

In the foregoing rule set, Rule 1A applies to a disassociated node (i.e., a node that is starting up and does not yet have a defined role), to leaf nodes and to bridge nodes. If the node does not have or acquire a symmetrical relationship with a cluster head within a predetermined time limit, the node will then declare itself to be a cluster head. A flowchart is provided in FIGS. 6A-6C that is useful for understanding the set of rules applied by each node. The process begins in FIG. 6A at 602 and continues to 604 where a node listens to determine if it can receive signals from any nearby cluster head (CH) node. At 606 a determination is made as to whether the node can hear a cluster head in its 1-hop neighborhood. If so, (606: Yes) it will declare itself a leaf node at 618. However, if the node cannot hear a cluster head node in its 1-hop neighborhood (606: No), the node will declare itself to be a cluster head node at 608. Such a node will then proceed at 610 to select bridge nodes from the set of nodes in its symmetric 1-hop neighborhood (nodes within 1-hop that it can successfully transmit to and receive from). A condition placed upon such nodes which are to be designated as bridge nodes is that they have symmetric links to at least one additional node in the 2-hop neighborhood of the cluster head node.

The process continues at 612 in which the node continues to operate as a cluster head node. The cluster head node will periodically check at 614 to determine whether it hears any other cluster head nodes within 1-hop. If so (614: Yes), and the link is determined to be symmetric (616: Yes), then the cluster head node will relinquish its role as a cluster head and will become a leaf node at 618.

A node will check at 620 to verify that it has a symmetric link to the other cluster head node within 1-hop. If the link is verified (620: Yes), the node will continue at 622 in its role as a leaf node. However, if no symmetric link to the detected cluster head node can be established (620: No), then the leaf node will revert at 604 to its former condition.

Figure 6B:
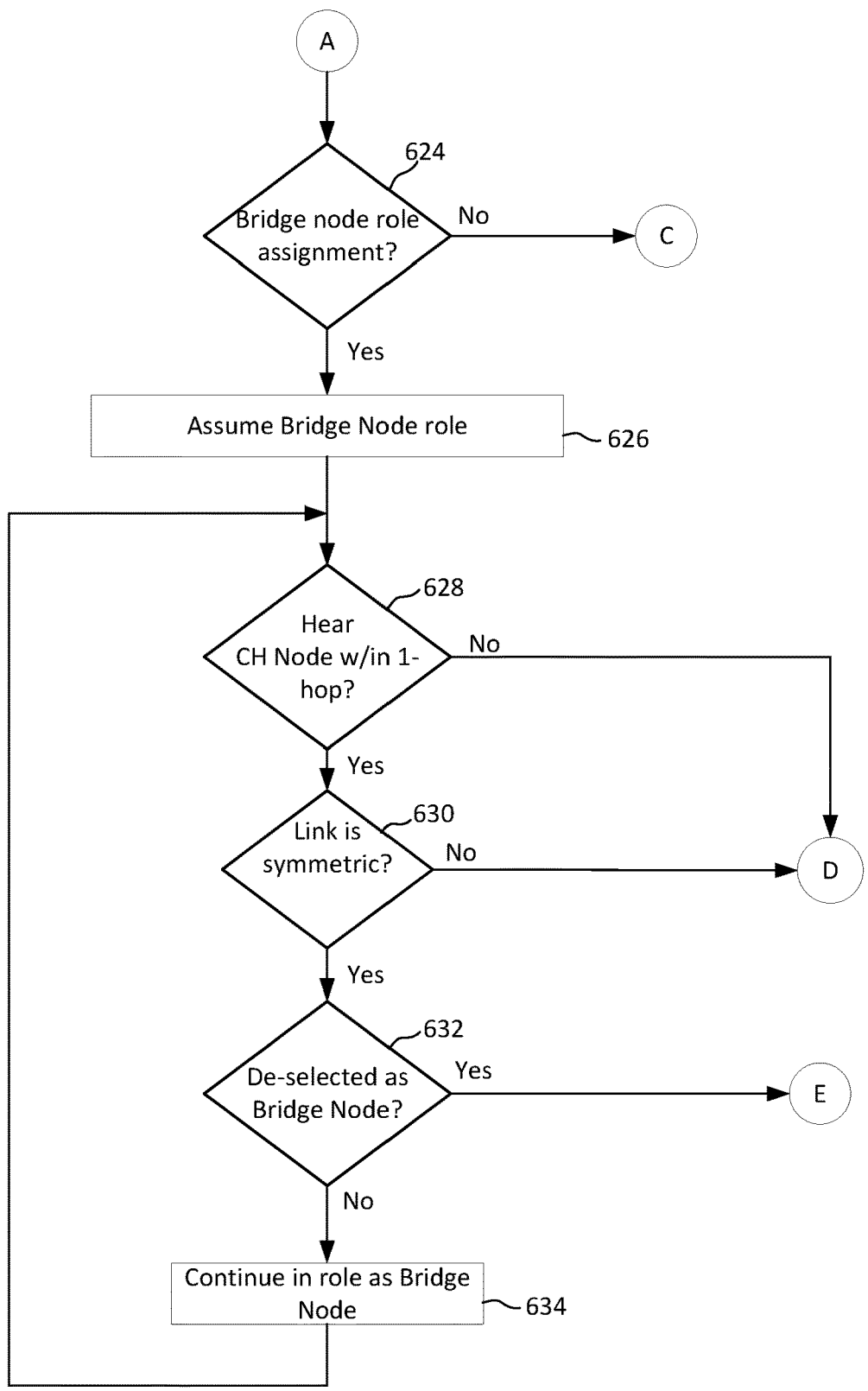

Once a node declares itself as a leaf node, the process will continue on to 624 in FIG. 6B where a determination can be made as to whether the node has been assigned a role as a bridge node. If so (624: Yes), the node will assume the role of a bridge node at 626 and the process will continue on to 628. At 628, the node will periodically check to determine whether it can continue to hear a cluster head node within its 1-hop neighborhood. If so, (628: Yes) and the link is symmetric (630: Yes) then node will continue in its role as a bridge node. If the bridge node can no longer hear a cluster head node (628: No) and/or the link is found not to be symmetric (630: No) then the node which had been operating as a bridge node will instead return to 608 and declare itself to be a cluster head node.

Figure 6C:
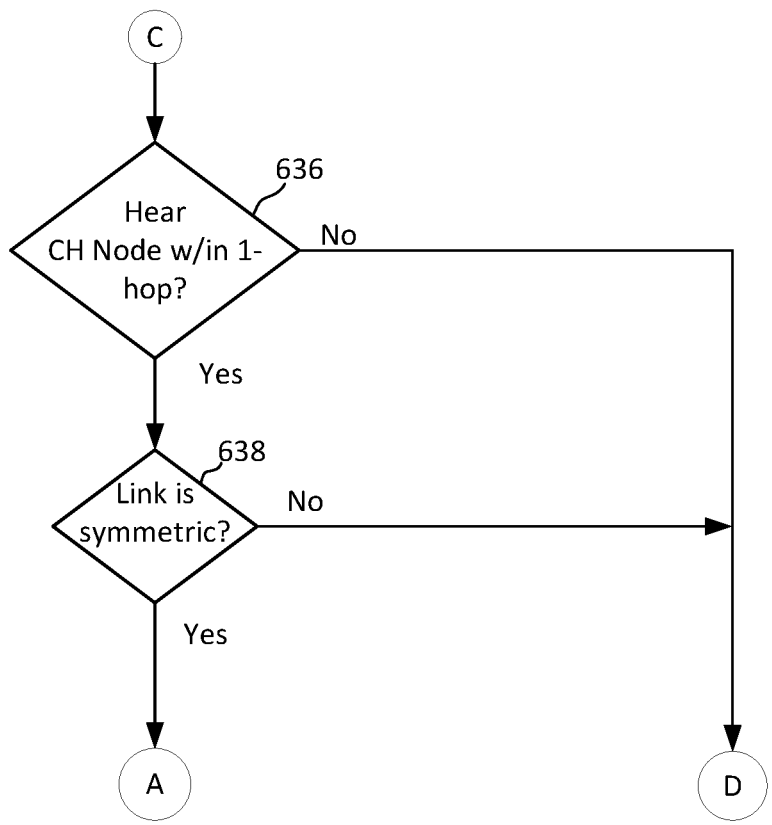

A leaf node which has not been assigned a role as bridge node (624: No) and/or a bridge node that has been de-selected (632: Yes) will function as a leaf node. As shown in FIG. 6C, such a node will periodically check to determine whether it can hear a cluster-head node within 1-hop (636: Yes) and that the communication link with such cluster head is symmetric (638: Yes). If these conditions are met, the node will continue as a leaf node and the process returns to 624. However, if the leaf node can no longer hear a cluster head node or determines that the link is no longer symmetric, then the process returns to 608 and the node declares itself a cluster head.

A node which has designated itself a network role as a cluster head or Tier 1 transmitter will choose a cluster ID corresponding to a set of TDMA Tier 1 beacon slots 206. The precise method by which a cluster head node selects its cluster ID and corresponding Tier 1 beacon slots (see FIG. 3) is not critical and various mechanisms are possible. However, in a network solution disclosed herein, the process of selecting such slots will advantageously occur without the need for centralized control and/or communication with a singular node having overall network control responsibility. For example, in one scenario a cluster head can monitor Tier 1 network communications to identify certain Tier 1 beacon slots that are or are not in use. Alternatively, or in addition thereto, such monitoring can involve certain control plane time slots associated with the TDMA waveform that contain information relating to known Tier 1 beacon channel usage. In other scenarios, various alternative types of out-of-band signaling such as special dedicated RF control channels can also be monitored for this purpose. Combinations of these various methodologies are also possible. In all such implementations, the goal will be to allow those nodes which self-select to become cluster heads to quickly and efficiently gain access to a specific set of TDMA Tier 1 beacon slots that are conflict-free.

Referring again to FIG. 5, a node 302 which has assigned to itself a network role as a cluster head 306 will subsequently assign to one or more of its 1-hop neighbors a network role as a bridge node 308. Bridge nodes or bridges are nodes that are chosen by cluster heads based on their ability to communicate with nodes that are 2-hop neighbors of the cluster head node. If a cluster head node 306 determines that a particular 1-hop neighbor node is needed to reach 2-hop neighbors, it can choose to designate such 1-hop neighbor as a bridge node 308. In some scenarios, a cluster head node 306 can then use its Tier 2 beacon communication service to inform one or more of its selected 1 hop neighbors that they have been designated a network role as a bridge node. Any remaining nodes of the network which are not cluster head nodes or bridge nodes are considered to be leaf nodes 310. Accordingly, by applying a predetermined set of clustering rules as described herein, a network-spanning communication backbone 312 is established to facilitate the Tier 1 communications service. Due to the rules regarding the selection of cluster head nodes 306 and bridge nodes 308, it is ensured that all Tier 1 communications propagated though the communication backbone 312 can always be heard by all nodes of the network 300, including leaf nodes 310. Communication along the backbone 312 can advantageously involve use an avalanche communication method.

The Tier 1 communication service through the communication backbone 312 can be used for various purposes. One initial purpose for which the service can be used is for de-confliction of Tier 1 communications. Tier 1 communication conflicts can arise when different cluster head nodes choose for their transmissions the same set of Tier 1 beacon time slots. Such a communication conflict is undesirable and can make it difficult for the nodes to communicate. Accordingly, the communication network disclosed herein can advantageously provide a de-confliction mechanism.

The precise method applied for de-confliction of Tier 1 beacon time slot usage is not critical and various mechanisms are possible. In all such implementations, the goal will be to allow cluster head nodes to quickly and efficiently gain access to a set of TDMA Tier 1 beacon slots that are globally conflict-free across the communication backbone. However, in a network solution disclosed herein, the process of de-confliction will advantageously occur without the need for centralized control and/or communication with a singular node having overall network control responsibility.

For example, in one scenario each cluster head node 306 shown in FIG. 5 can share with other cluster head nodes the Tier 1 beacon time slots 206 (see FIG. 3) that the particular cluster head node has chosen for itself for Tier 1 transmissions. The communication backbone and associated Tier 1 communication service can be used for such communications. Avalanche communication methods are advantageously applied to facilitate such communications. Cluster head nodes that receive such information regarding Tier 1 beacon time slot usage can use such data to facilitate de-confliction. For example, a node receiving such data can compare a list of Tier 1 beacon time slots that are being used by other nodes with the receiving node's own selection of Tier 1 beacon time slots. If, based on this comparison, a cluster head node detects that it is using the same Tier 1 beacon time slots as another cluster head node, then it recognizes that a conflict exists. In such a scenario, the cluster head node that detects the conflict can automatically select a different set of Tier 1 beacon time slots for its own use. To further reduce the potential for such conflicts, each cluster head node can choose its Tier 1 beacon time slots in accordance with a randomized selection process. The foregoing de-confliction process can be repeated at regular intervals to ensure that no new conflicts have arisen.

Once a cluster head node has established and de-conflicted its Tier 1 beacon time slots it can continue by communicating with other nodes of the network. For example, each cluster head can send through the backbone certain information concerning its one-hop neighbors. For example, such information can include the identity or logical name of each of such 1-hop neighbors. The self-selection rules which are applied for cluster head network role acquisition, ensure that Tier 1 communications through the backbone can be received by all nodes of the network. Accordingly, when 1-hop neighbor information is broadcast by a cluster head node through the backbone, such information is received by all nodes in the network regardless of whether they are designated as cluster heads, bridges or leaf nodes.

By communicating information about their 1-hop neighbors, each cluster head ensures that every node of the network will know (1) the identity of all nodes and (2) the route-ability of each node. Further, each node comprising the network can determine the number of transmission hops needed for a message packet to reach a particular node. The foregoing information is then used by all nodes of the network for purposes of facilitating routine communication of network voice and data traffic.

All cluster heads and bridges relay every backbone transmission. Further, Tier 1 communications through the backbone advantageously involve avalanche communication methods in which two or more nodes transmit the same data concurrently during the same time slot. A node receiving both such transmissions will treat the two nearly simultaneous messages as multipath communications of the same message. This improves the chances of reception by the receiving node and has the beneficial effect of improving bandwidth utilization since both messages are broadcast at the same time. A further advantage of this avalanche method of communication is that it allows receiving nodes to imply the identity of the node that originated a particular message. In a network solution disclosed herein, certain time slots can be exclusively assigned during a period of time for use only by certain cluster nodes. Consequently, if a transmission is detected or received during such time slots, the originator of such message may be inferred or implied to be the particular node which has been assigned exclusive use of such time slots.

More particularly, a time-slot utilization scheme can be employed in which a particular time slot 104 is used by different backbone nodes during different epochs 106. Every backbone node will ultimately use a particular numbered time slot but will do so in different epochs. In this respect usage of a particular time slot is said to be multiplexed. For example, during a first epoch a particular slot (e.g., time slot 2) may be used by a first node having a first cluster ID. During a second epoch following the first epoch, the same time slot may be used by a second node having a second cluster ID. In a third epoch following the second epoch, the same time slot may be used by a third node having a third cluster ID. This process can continue until the particular time slot has been used by all nodes in the network. In the foregoing time slot utilization scheme, a particular node which uses a time slot will vary with each subsequent epoch. Accordingly, the backbone can employ a multiplexed slot utilization scheme.

With the foregoing arrangement, ownership or use of the same numbered time slot changes with each iteration of the epoch. Therefore, it is useful to further designate a particular time slot with a reference identification which goes beyond simply referencing the number of the time slot. For example, the same numbered time slot could be respectively referenced in a first, second and third epoch as multiplexed slot iteration 1, iteration 2, and iteration 3. However, this language is somewhat cumbersome, and it can sometimes be convenient to refer to the same multiplexed time slot in different epochs by using a designation referred to herein as either multiplexed slot numbers or mux reference numbers.

These mux reference numbers identify and differentiate iterations of the same time slot in different epochs.

The foregoing concept is illustrated in FIG. 7. In this example, a node with cluster ID of CID1 can originate data traffic in a particular time slot (e.g., slot 2) during a first epoch (Epoch 1). This time slot is referenced in FIG. 7 as multiplexed slot 0 or Mux 0 and is a first data transmission hop within the network. In the following epoch (Epoch 2), the Tier 1 neighbors of CID1 will forward their traffic in the same time slot (slot 2). But in Epoch 2 this time slot is referenced as multiplexed slot 1 or Mux 1. This transmission represents a second transmission hop. The third hop will occur in the following epoch (Epoch 3). In Epoch 3, the same time slot (slot 2 in this example) is used once again for data transmission. But in Epoch 3, this time slot is referenced as Mux 2.

In the scenario illustrated in FIG. 7, there are four different cluster head nodes which respectively have a cluster ID of CID1, CID2, CID3, and CID4. Each cluster head in this example has an assigned set of multiplex slots corresponding to its cluster ID. For example, CID1 is assigned Mux 0 in a first epoch (Epoch 1), Mux 1 in a second epoch (Epoch 2), and Mux 2 in a third epoch (Epoch 3). After a minimum of three hops, use of the same three muxs can be repeated. Similar mux assignments are made for CID2 (Muxs 3, 4, 5); CID3 (Muxs 6, 7, 8); and CID4 (Muxs 9, 10, 11). Notably, these muxs use the same time slot (slot 2 in this scenario) that is used by CID1, but they do so in different epochs and therefore have different mux number references assigned thereto. For example, in Epochs 4, 5 and 6 the same time slot (slot 2 in this example) is respectively referenced as Mux 3, 4 and 5, and use of these muxes is assigned to CID2. In Epochs 7, 8 and 9, the same time slot (slot 2 in this example) is respectively referenced as Mux 6, 7 and 8, and use of these muxes is assigned to CID3. In Epochs 10, 11 and 12, the same time slot is respectively referenced as Mux 9, 10 and 11, and use of these muxes is assigned to CID4. In this way the same slot is used by cluster head nodes CID1, CID2, CID3 and CID4. Each such cluster head node has its own opportunity to transmit a message and to have that message relayed.

In FIG. 7, "Tx" refers to an original transmission of a message M from an originating node. "Relay" refers to a subsequent relay transmission of the same message by other bridge and cluster head nodes within the network. For example, in the case of CID1 an originating node transmits a message M in Epoch 1, Mux 0 (E1, MX0). A 1-hop neighbor node of the originating node relays the message M at Epoch 2, Mux 1 (E2, MX1), and a 2-hop neighbor node of the originating node relays the message M at E3, MX2. A similar process occurs with respect to transmissions originating from CID2, CID3, and CID4. All nodes in the network know which muxes are assigned to a particular cluster head node. Therefore, a node which receives a transmission can always infer the cluster head node from which the message originated based on the particular epoch and mux during which the message is received.

Note that in the above example, there are five relay occurrences for each TX message and no subsequent transmission of a second message is shown. However, Tier 1 network mux re-use rules allow a source or originating node to again transmit after the first data packet has transited a minimum of three hops. This is permitted because it is assumed that after 3 hops, that any relay transmissions are sufficiently geographically distant from source node such that the associated relay signals will be substantially attenuated relative to the source node. Accordingly, a subsequent transmission of another message M2 could occur from the originating node CID1 at E4, MX0. To avoid potential confusion, this further message transmission of M2 by CID1 is not shown in FIG. 7.

Further, in FIG. 7 it may be observed that for each cluster head CID1, CID2, CID3 and CID4 there is a relatively long delay between the occurrence of Relay 2 and Relay 3. In this regard it may be noted that each epoch will have some duration (e.g., 30 milliseconds) depending on the system design. And it is shown that a number of epochs may transpire between the occurrence of Relay 2 and Relay 3. Accordingly, it will be understood that the first two hops for a transmitted message will occur with minimal latency, but a longer amount of time is needed before the occurrence of the 3rd hop. Also it may be noted that the number of necessary muxes N is determined by MaxCluster×HopsPerCluster, where MaxCluster is the maximum number of clusters which may exist in the network and HopsPerCluster is the number of hops permitted before a time slot can be reused. This number can be set to allow for a minimum of 3 hops, but in some scenarios, it may be desirable to allow for a larger number (e.g., 5 hops) before re-use occurs.

It should further be understood that the mux assignments shown in FIG. 7 are merely presented for purposes of illustrating the foregoing concept and are not intended to be limiting. Other mux assignments methods are also possible, and all such time slot assignment methodologies are included within the scope of a network solution disclosed herein.

Figure 8:
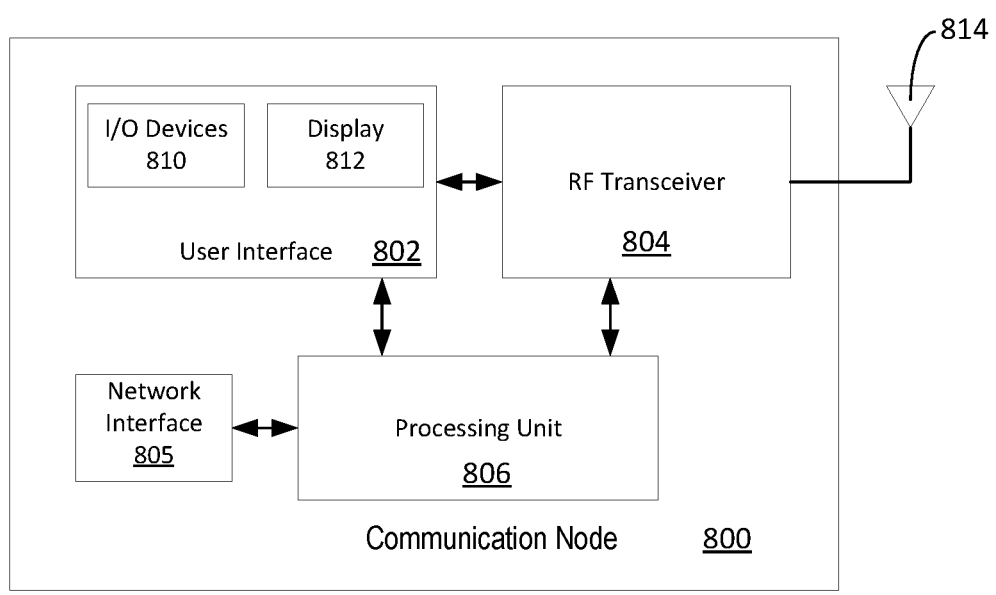
FIG. 8 is a block diagram which is useful for understanding a communication node of a MANET.

Shown in FIG. 8 is an block diagram of a MANET communication node 800 which is useful for understanding certain aspects of a communication solution described herein. The communication node includes a user interface 802, an RF transceiver 804, a network interface 805, and a processing unit 806. The user interface 802 can include input/output devices such as a microphone, a loudspeaker, and a keypad. The user interface can also include a display unit 812. In some scenarios, a network interface device 805 can be provided to allow the node to receive and transmit data from one or more computing machines comprising a computer network (not shown). Data and voice communications are transmitted and received wirelessly at node 800 using RF transceiver 804. The transceiver 804 can be configured to communicate through antenna 814 using a TDMA waveform. Control over such data communications are facilitated by the processing unit 806. In some scenarios, the processing unit can be configured to cause the node 800 to implement one or more communications in accordance with the methods and techniques described herein.

The processor unit 806 can comprise one or more components such as a processor, an application specific circuit, a programmable logic device, a digital signal processor, or other circuit programmed to perform the functions described herein. Embodiments can be realized in one computer system or several interconnected computer systems. Any kind of computer system or other apparatus adapted for carrying out the methods described herein is suited. The computer system can have a computer program that can control the computer system such that it carries out the methods described herein.

Communication node 800 should be understood to be one possible example of a communication node which can be used in connection with the various embodiments. However, the embodiments are not limited in this regard and any other suitable node architecture can also be used without limitation.

Figure 9:
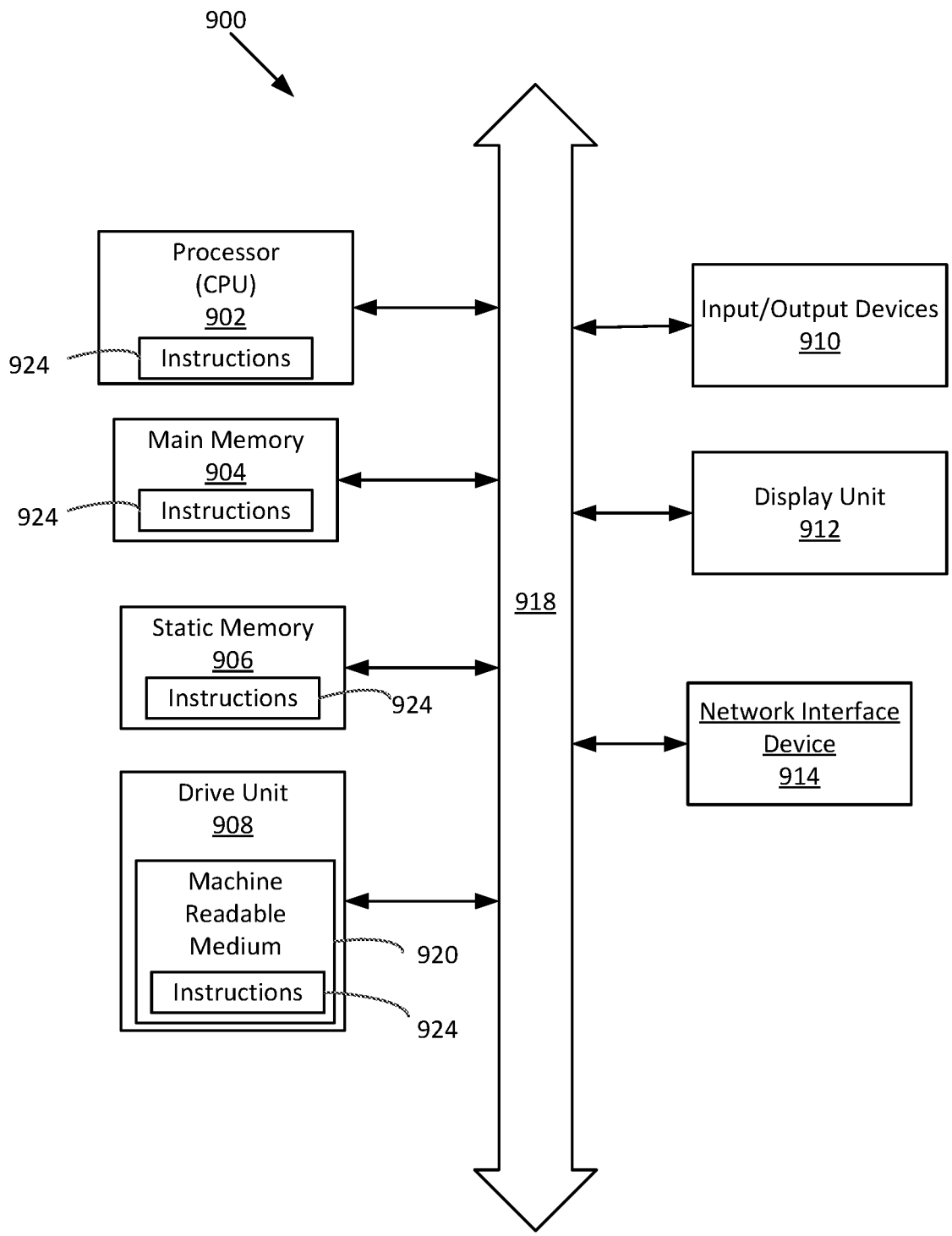
FIG. 9 is a block diagram which is useful for understanding a processing unit of a communication node that can perform certain operations as described herein for purposes of implementing a MANET network.

Referring now to FIG. 9, there is shown a hardware block diagram comprising an exemplary computer system 900. The machine can include a set of instructions which are used to cause the computer system to perform any one or more of the methodologies discussed herein. In one or more embodiments, the exemplary computer system 900 can correspond to processing unit 806. While only a single machine is illustrated it should be understood that embodiments can be taken to involve any collection of machines that individually or jointly execute one or more sets of instructions as described herein.

The computer system 900 is comprised of a processor 902 (e.g. a central processing unit or CPU), a main memory 904, a static memory 906, a drive unit 908 for mass data storage and comprised of machine readable media 920, input/output devices 910, a display unit 912 (e.g. a liquid crystal display (LCD) or a solid state display), and a network interface device 914. Communications among these various components can be facilitated by means of a data bus 918. One or more sets of instructions 924 can be stored completely or partially in one or more of the main memory 904, static memory 906, and drive unit 908. The instructions can also reside within the processor 902 during execution thereof by the computer system. The input/output devices 910 can include a keyboard, a mouse, a multi-touch surface (e.g. a touchscreen) and so on. The network interface device 914 can be comprised of hardware components and software or firmware to facilitate network data communications in accordance with a network communication protocol.

The drive unit 908 can comprise a machine readable medium 920 on which is stored one or more sets of instructions 924 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 900 should be understood to be one possible example of a computer system which can be used in connection with the various embodiments. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

We claim:

1. A method for managing a Mobile ad hoc Network (MANET), comprising:

self-assigning by a first node of a plurality of nodes comprising the MANET a role as a part of a network-spanning backbone upon a determination by the first node that one or more criteria have been satisfied;

using by the first node the network-spanning backbone to facilitate a first tier control plane communication service within the MANET;

communicating by the first node within the MANET using a second tier control plane communication service separate from the first tier control plane communication service when communicating exclusively with neighbor nodes that are a 1-hop distance from the first node.

2. The method of claim 1, further comprising choosing by the first node one or more bridge nodes of said first tier control plane communication service which facilitate communication by the first-node with neighbor nodes that are a 2-hop distance from the first node.

3. The method of claim 1, wherein the first node uses the network-spanning backbone to facilitate communication with all nodes of the network.

4. The method of claim 1, wherein the role is as a cluster-head in the first tier control plane communication service, and further comprising choosing by the first node a cluster ID corresponding to a set of time slots in a Time Division Multiple Access (TDMA) waveform.

5. The method of claim 4, wherein the first node uses the network-spanning backbone to facilitate de-confliction of the cluster ID.

6. The method of claim 4, wherein the first node uses the network-spanning backbone to communicate information concerning all of its 1-hop neighbors to the plurality of nodes comprising the MANET.

7. The method of claim 4, wherein the first node uses an avalanche communication method to facilitate the first tier control plane communication service in which identification the first node as the source of transmitted messages is implied based on the time slot in which the message is communicated.

8. The method of claim 1, further comprising claiming by the first node a tier 2 beacon time slot of the TDMA waveform.

9. The method of claim 8, further comprising using by the first node the tier 2 beacon time slot to confirm that the tier 2 beacon time slot is conflict free within a 2-hop distance of the first node.

10. The method of claim 8, further comprising using by the first node the tier 2 beacon time slot to discover its neighbor nodes which are within a 2-hop distance of the first node.

11. The method of claim 8, further comprising using by the first node the tier 2 beacon time slot to determine a network role of each of the neighbor nodes within a 2-hop distance of the first node.

12. The method of claim 11, wherein the first node uses information it has determined concerning the network role of each of the neighbor nodes within the 2-hop distance as a basis for determining whether the one or more criteria have been satisfied.

13. A communication node for communicating in a Mobile ad hoc Network (MANET), comprising:
a communication transceiver configured to facilitate wireless communications between the communication node and other nodes of the MANET;
a computer processor device configured to
self-assign to the communication node a role as a part of a network-spanning backbone of the MANET upon a determination by the communication node that one or more criteria have been satisfied, the network spanning backbone comprising a plurality of nodes of the MANET;
cause the communication node to use the network-spanning backbone to facilitate a first-tier control plane communication service within the MANET;
cause the communication node to communicate within the MANET using a second-tier control plane communication service separate from the first-tier control plane communication service when communicating exclusively with neighbor nodes that are a 1-hop distance from the communication node.

14. The communication node of claim 13, wherein the computer processor device is further configured to choose one or more bridge nodes of said first tier control plane communication service to facilitate communication by the communication node with one or more neighbor nodes that are a 2-hop distance from the communication node.

15. The communication node of claim 13, wherein the computer processor device is further configured to cause the communication node to use the network-spanning backbone to facilitate communication with all nodes of the network.

16. The communication node of claim 13, wherein the role is as a cluster-head in the first tier control plane communication service, and wherein the computer processor device is further configured to choose a cluster ID corresponding to a set of time slots in a Time Division Multiple Access (TDMA) waveform.

17. The communication node of claim 16, wherein the computer processor device is further configured to cause the communication node to use the network-spanning backbone to facilitate de-confliction of the cluster ID.

18. The communication node of claim 16, wherein the computer processor device is further configured to cause the communication node to use the network-spanning backbone to communicate information concerning all of its 1-hop neighbors to the plurality of nodes comprising the MANET.

19. The communication node of claim 16, wherein the computer processor device is configured use an avalanche communication method to facilitate the first tier control plane communication service in which identification the communication node as the source of transmitted messages is implied based on the time slot in which the message is communicated.

20. The communication node of claim 13, wherein the computer processor device is configured to claim for the communication node a tier 2 beacon time slot of the TDMA waveform.

21. The communication node of claim 20, wherein the computer processor device is configured to use the tier 2 beacon time slot to confirm that the tier 2 beacon time slot is conflict free within a 2-hop distance of the communication node.

22. The communication node of claim 20, wherein the computer processor device is configured to use the tier 2 beacon time slot to discover its neighbor nodes which are within a 2-hop distance of the communication node.

23. The communication node of claim 20, wherein the computer processor device is configured to use the tier 2 beacon time slot to determine a network role of each of the neighbor nodes within a 2-hop distance of the communication node.

24. The communication node of claim 23, wherein the computer processor device is configured to use information it has determined concerning the network role of each of the neighbor nodes within the 2-hop distance as a basis for determining whether the one or more criteria have been satisfied.

* * * * *